US009347587B2

(12) United States Patent
Allivato, Sr. et al.

(10) Patent No.: US 9,347,587 B2
(45) Date of Patent: May 24, 2016

(54) DUCT MOUNTING SYSTEM AND KIT

(71) Applicants: James John Allivato, Sr., Morgan Hill, CA (US); Linda Marie Allivato, Morgan Hill, CA (US)

(72) Inventors: James John Allivato, Sr., Morgan Hill, CA (US); Linda Marie Allivato, Morgan Hill, CA (US)

( * ) Notice: Subject to any disclaimer, the term of this patent is extended or adjusted under 35 U.S.C. 154(b) by 131 days.

(21) Appl. No.: 13/943,407

(22) Filed: Jul. 16, 2013

(65) Prior Publication Data
US 2014/0061395 A1 Mar. 6, 2014

Related U.S. Application Data

(60) Provisional application No. 61/697,243, filed on Sep. 5, 2012.

(51) Int. Cl.
*F16L 3/00* (2006.01)
*F16L 3/12* (2006.01)
*F16L 3/10* (2006.01)
*F16L 3/20* (2006.01)

(52) U.S. Cl.
CPC ............ *F16L 3/1207* (2013.01); *F16L 3/1058* (2013.01); *F16L 3/20* (2013.01)

(58) Field of Classification Search
CPC .......... F16L 3/20; F16L 3/1207; F16L 3/1058
See application file for complete search history.

(56) References Cited

U.S. PATENT DOCUMENTS

| 376,480 | A | | 1/1888 | Kenway |
|---|---|---|---|---|
| 535,094 | A | | 3/1895 | Edwards |
| 1,612,959 | A | | 1/1927 | Zifferer |
| 1,758,040 | A | | 5/1930 | Hess |
| 1,772,062 | A | | 8/1930 | Zifferer |
| 1,819,754 | A | | 8/1931 | Mott |
| 1,883,935 | A | | 10/1932 | Kelley |
| 2,643,079 | A | | 6/1953 | Pitt |
| 2,835,464 | A | | 5/1958 | Kolodin |
| 2,984,442 | A | | 5/1961 | Lawson |
| D199,587 | S | | 11/1964 | Piasecki |
| 3,232,569 | A | | 2/1966 | Deardorf |
| 3,568,455 | A | * | 3/1971 | McLaughlin ............ E03F 3/06 138/105 |
| 4,020,531 | A | | 5/1977 | Ahrens et al. |
| 4,166,600 | A | | 9/1979 | Perjes |

(Continued)

FOREIGN PATENT DOCUMENTS

| EP | 0891507 B1 | 1/1999 |
|---|---|---|
| EP | 1845295 A1 | 10/2007 |

(Continued)

OTHER PUBLICATIONS

Brochure, "Roof Pipe Support Systems" published by Portable Pipe Hangers, Inc., 5534 Harvey Wilson Drive, Houston TX 77020, www.phpsd.com, date of publication 2010.

*Primary Examiner* — Jeanette E Chapman
(74) *Attorney, Agent, or Firm* — Holland & Hart LLP

(57) ABSTRACT

A duct mounting system. The system includes a support saddle having a duct surface shaped to accommodate and support a duct, a first support ear defined in a first extremity of the support saddle and a second support ear defined in a second extremity of the support saddle, a retaining strap connectable between the first and second support ears, a first support leg having an extremity connectable to an external structure, and a first saddle connector that couples the first support leg to the first support ear. The support saddle has a stiffening stem. The retaining strap is shaped to clamp a duct onto the duct surface.

4 Claims, 22 Drawing Sheets

(56) References Cited

U.S. PATENT DOCUMENTS

| | | | |
|---|---|---|---|
| 4,300,738 A | 11/1981 | Whinfrey | |
| 4,413,799 A | 11/1983 | Gabriel | |
| 4,544,119 A | 10/1985 | Kellett et al. | |
| 4,618,114 A | 10/1986 | McFarland | |
| 4,654,612 A | 3/1987 | Smith | |
| 4,765,106 A * | 8/1988 | Modrovich | E04F 21/22 248/70 |
| 4,844,389 A | 7/1989 | Nimtz | |
| 4,998,691 A * | 3/1991 | Brown | F16L 3/1016 248/68.1 |
| 5,040,751 A | 8/1991 | Holub | |
| 5,221,064 A | 6/1993 | Hodges | |
| D342,441 S | 12/1993 | Valdez et al. | |
| 5,303,885 A | 4/1994 | Wade | |
| 5,364,053 A | 11/1994 | Rodgers | |
| 5,553,975 A | 9/1996 | Elkins | |
| 5,746,401 A | 5/1998 | Condon | |
| 5,769,112 A * | 6/1998 | Rendina | E03B 9/04 137/272 |
| 6,102,341 A | 8/2000 | Ball | |
| 6,132,141 A * | 10/2000 | Kirk | E02D 5/801 248/49 |
| D436,028 S | 1/2001 | Wagner et al. | |
| 6,685,144 B1 * | 2/2004 | Wochnick | F16L 3/085 248/60 |
| 7,213,790 B2 | 5/2007 | Bailey et al. | |
| 7,331,549 B2 | 2/2008 | Wirth, Jr. et al. | |
| 7,455,268 B2 | 11/2008 | Heath | |
| 7,475,513 B2 | 1/2009 | Parker | |
| 7,540,452 B2 | 6/2009 | Caminita | |
| 7,845,598 B2 | 12/2010 | Wirth, Jr. et al. | |
| 7,926,766 B2 | 4/2011 | Tjerrild | |
| 8,047,476 B2 | 11/2011 | Van Walraven | |
| 8,070,113 B1 | 12/2011 | Kirschner | |
| 8,100,368 B2 * | 1/2012 | Jackson et al. | 248/62 |
| 2007/0089932 A1 | 4/2007 | Boyett | |
| 2007/0114791 A1 * | 5/2007 | Williams | 285/142.1 |
| 2008/0054128 A1 | 3/2008 | Ivarsson et al. | |
| 2013/0118627 A1 | 5/2013 | Utay | |

FOREIGN PATENT DOCUMENTS

| | | |
|---|---|---|
| EP | 1929601 B1 | 7/2010 |
| JP | 114045 A1 | 4/2003 |

* cited by examiner

DUCT MOUNTING SYSTEM AND KIT

CLAIM OF PRIORITY

This patent application claims priority from Provisional Patent Application No. 61/697,243 filed 5 Sep. 2012, the entire contents of which are incorporated herein by reference.

BACKGROUND

Ductwork conveys gases, typically air, from point to point. For example, heating and air conditioning (HVAC) systems use ducts to carry heated or cooled air and sometimes steam from place to place within a building and occasionally from one building to a nearby one. Ductwork is also used to carry industrial exhaust gases, fumes, dust, shavings, and other pollutants from work areas to an external exhaust through a cleaning or scrubbing station that removes contaminants. Ducts may also be used for such purposes as enclosing a set of electrical conduits.

Depending on the particular installation, it may be necessary to mount and support ductwork in any of several different ways. Some ductwork may be outdoors, for example on the walls or roof of an industrial building, and must be mounted securely enough to protect against the weather without over-stressing and perhaps collapsing the duct. Other ductwork may be installed indoors in overhead spaces such as above a suspended ceiling, and in this case the ductwork itself must be suspended from overhead structure. Still other ductwork may be located in spaces between walls, in basements, or in other environments each of which imposes unique mounting considerations.

Various items of hardware such as u-channel supports, angles, straps, clips, threaded shafts, and other things which may be made of steel, plastic, wood, or other materials are typically used to fashion mounting and support elements for ductwork. These mounting and support elements are often individually modified or hand-crafted on the job site of a ductwork installation project as needed.

BRIEF DESCRIPTION OF THE DRAWINGS

The figures are not drawn to scale. They illustrate the disclosure by examples.

DETAILED DESCRIPTION

Figure 1:
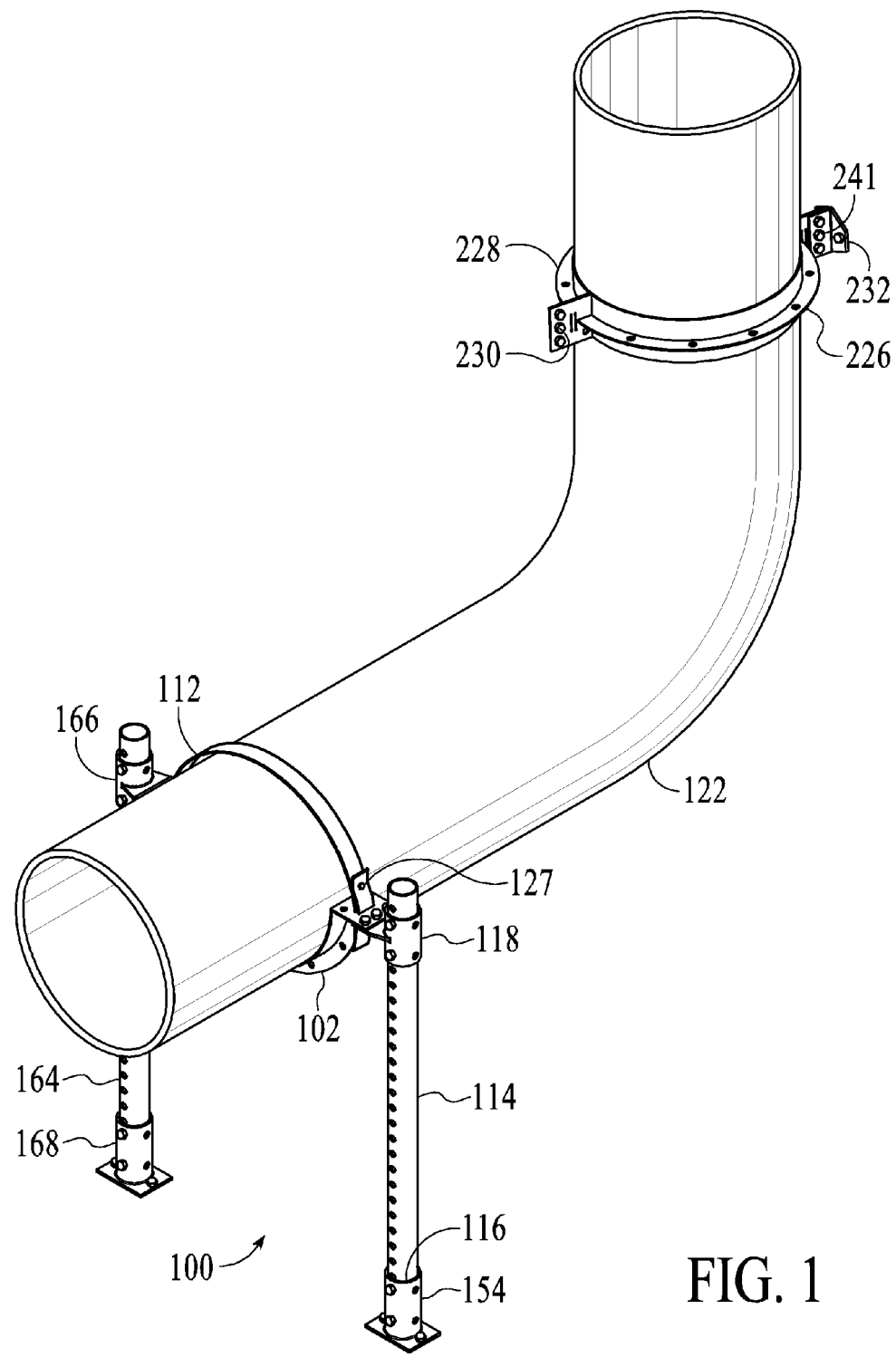
FIG. 1 is a perspective view of ductwork installed with a duct mounting system according to an embodiment.

Illustrative examples and details are used in the drawings and in this description, but other configurations may exist and may suggest themselves. Parameters such as dimensions are approximate. Terms of orientation such as up, down, top, and bottom are used only for convenience to indicate spatial relationships of components with respect to each other, and except as otherwise indicated, orientation with respect to external axes is not critical. For clarity, some known methods and structures have not been described in detail.

Items of hardware that are used for mounting and supporting ductwork typically are purchased off-the-shelf from general hardware stocks. These items typically are not specifically designed for the ducts to be installed and often do not fit correctly or contact the duct only in a few spots. Or the hardware is custom-fabricated in a workshop or at a job site for each project. The result is an installation that takes much time and effort and often does not adequately support the duct or that deforms the duct and constricts the flow of air or other gases through the duct. Such installations are prone to failure or may even lead to collapse of a duct that was improperly clamped or otherwise stressed by its mounts. There has been a need in the construction industry for a duct mounting system that properly supports the ductwork and that is readily adaptable to a wide variety of installations without any need to specially fabricate components on the job.

Figure 2:
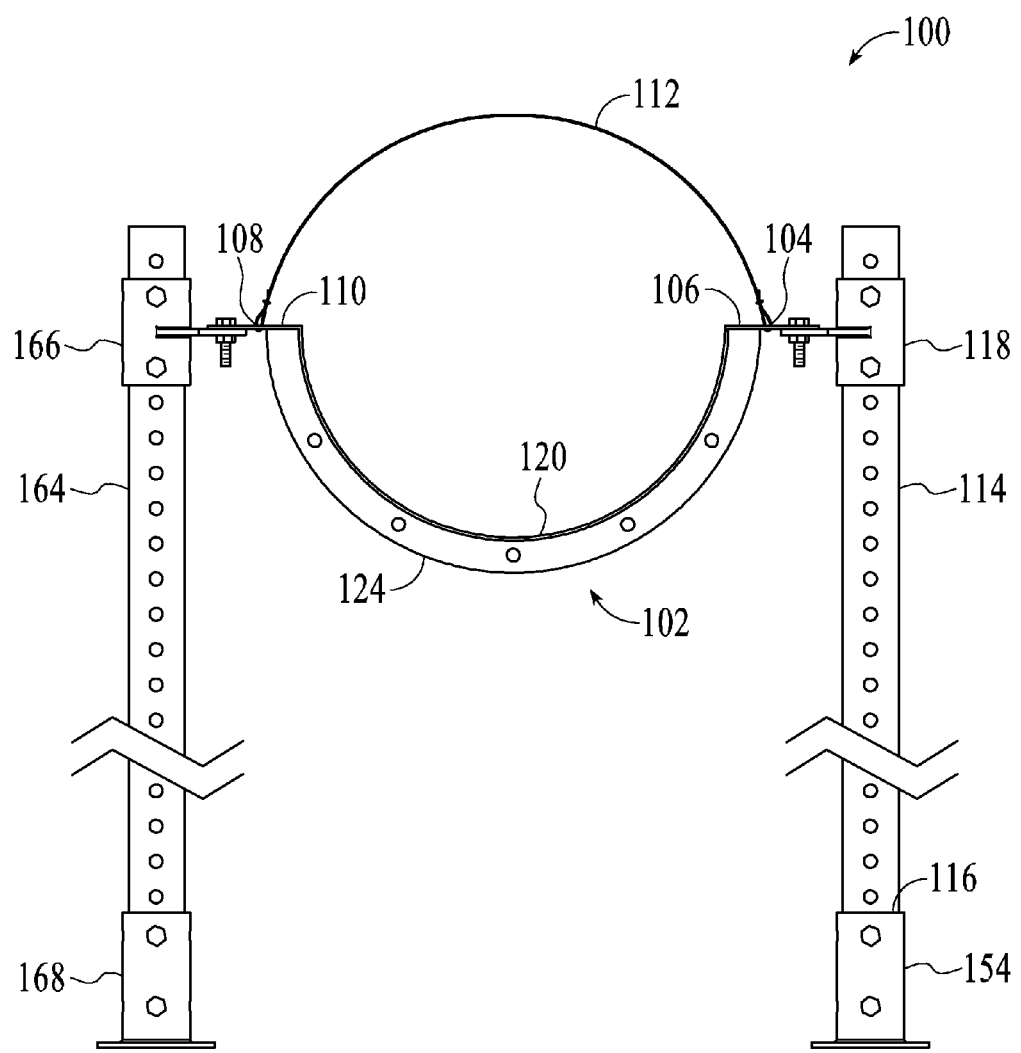
FIG. 2 is a front view of the duct mounting system shown in FIG. 1 without the ductwork.
Figure 3:
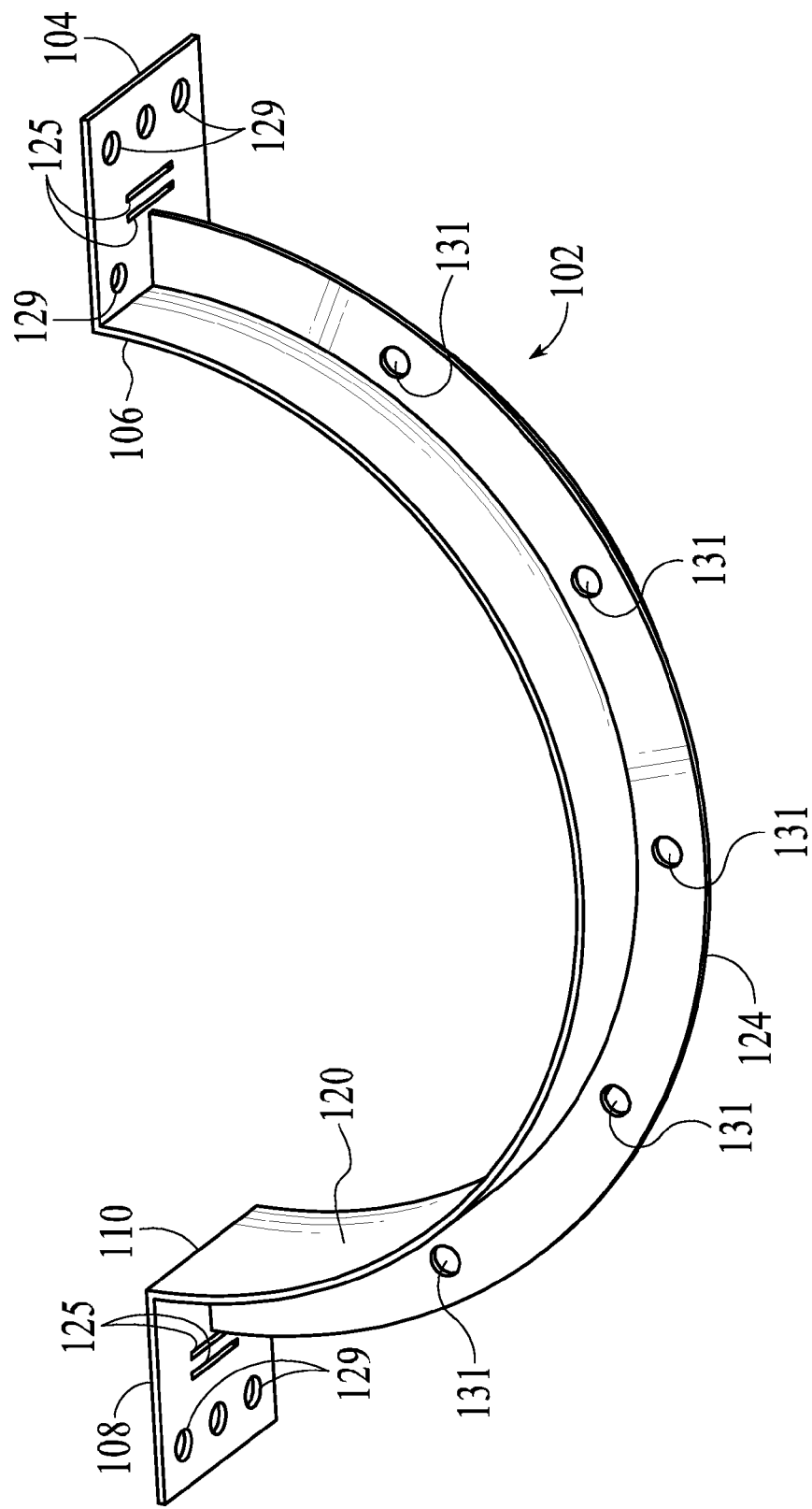
FIG. 3 is a perspective view of an embodiment of a support saddle.

Referring to FIGS. 1 through 3, a duct mounting system generally 100 includes a support saddle 102; a first support ear 104 defined in a first extremity 106 of the support saddle and a second support ear 108 defined in a second extremity 110 of the support saddle; a retaining strap 112 connectable between the first and second support ears; a first support leg 114 having an extremity 116 connectable to an external structure; and a first saddle connector 118 coupling the first support leg 114 to the first support ear 104.

The support saddle 102 has a duct surface 120 shaped to accommodate and support a duct such as a duct 122. The support saddle 102 includes a stiffening stem 124 that extends along substantially the whole length of the support saddle. In this embodiment the duct has a generally circular cross-section and the duct surface is semicircular in shape such that it contacts the duct through approximately half of the circumference of the duct.

The retaining strap 112 is shaped to clamp a duct such as the duct 122 onto the duct surface 120. The retaining strap may be rigid and shaped for ducts of one particular shape, or the retaining strap may be flexible to accommodate ducts of various shapes. In this embodiment the retaining strap has a flat cross section, but in other embodiments the retaining strap may have a different cross sectional shape.

In some embodiments the support ears have one or more slots 125 for attaching the retaining strap 112. The strap may be inserted through the slots and folded back on itself and attached to itself by a fastener 127 as shown in FIG. 1. The support ears also have other mounting holes 129 for mounting to a saddle connector or coupler as will be described presently, and the stiffening stem 124 also may have one or more mounting holes 131.

Figure 4:
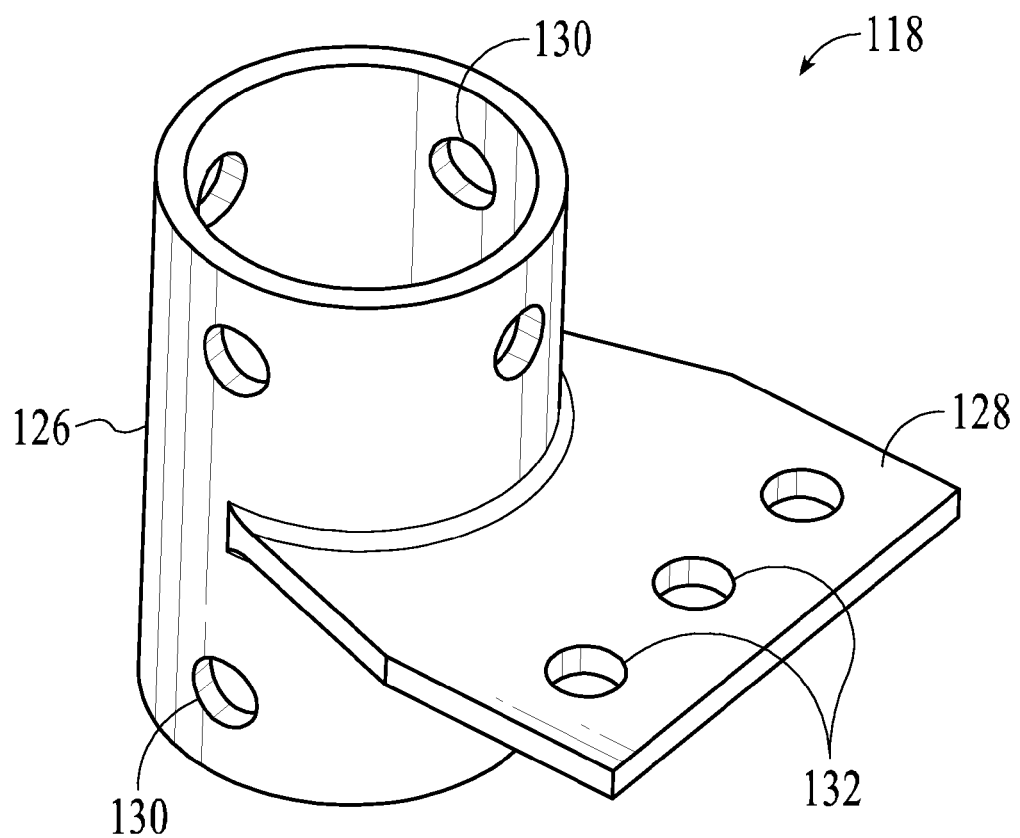
FIG. 4 is a perspective view of an embodiment of a saddle connector.

As shown in FIG. 4, in some embodiments the first saddle connector 118 comprises a tubular portion 126 shaped to receive the first support leg 114 and a planar portion 128 complementary in shape to the first support ear 104. The tubular portion has a plurality of mounting holes 130 that may be used for attaching the saddle connector to the first support leg by connectors such as screws or bolts. The planar portion 128 also has a plurality of mounting holes 132 that may be used by connectors such as screws or bolts for attaching the saddle connector to the first support ear. The planar portion 128 may comprise a flat plate affixed to the tubular portion by welding, adhesive, or the like, and extending laterally away from the tubular portion to facilitate coupling the saddle connector to the support ear.

Figure 5:
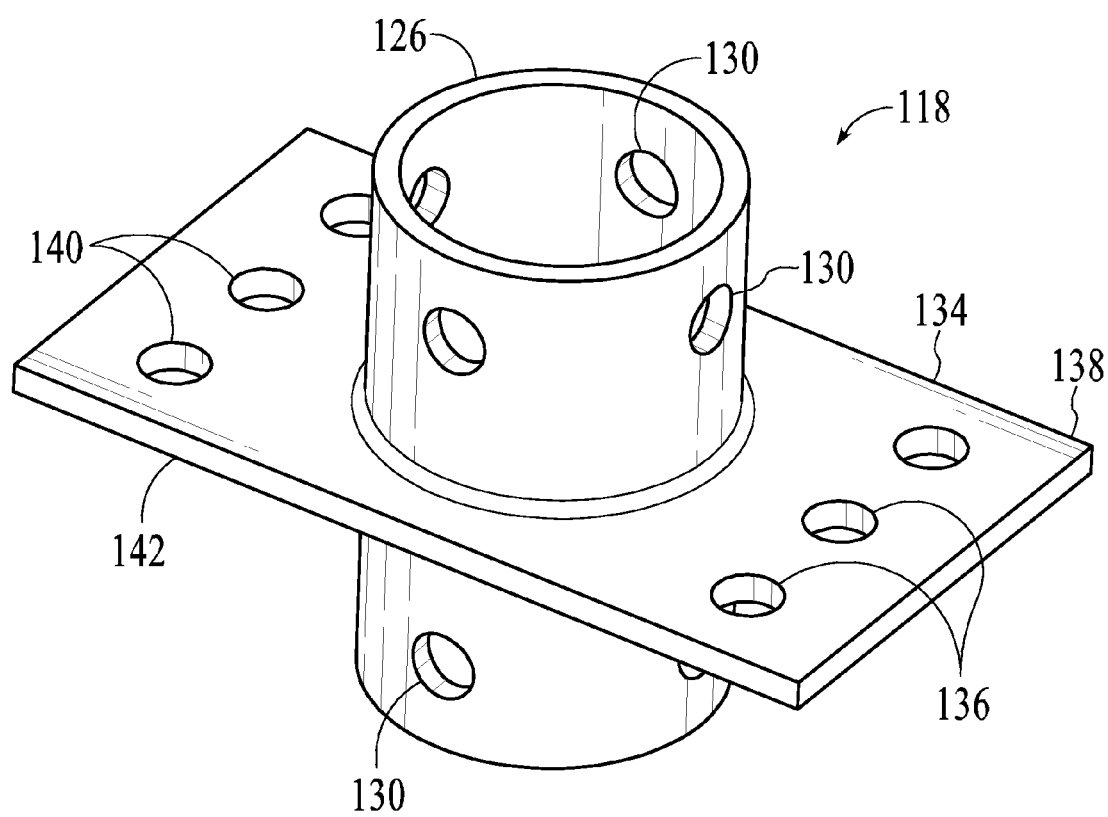
FIG. 5 is a perspective view of an embodiment of a saddle connector similar to that shown in FIG. 4 but with a planar portion extending laterally in more than one direction.

FIG. 5 illustrates an embodiment of a saddle connector that is similar to the first saddle connector 118 except that a planar portion 134 extends laterally away from the tubular portion in more than one direction. The planar portion 134 has a plurality of holes 136 in one extremity 138 for attaching the saddle connector to a support ear of one support saddle, and another plurality of holes 140 in another extremity 142 that may be used for attaching the saddle connector to a support ear of another support saddle, thereby enabling the first saddle connector and first support leg to support two ducts, one on either side of the saddle connector. This embodiment of a saddle connector will be discussed presently in connection with FIG. 11.

Figure 6:
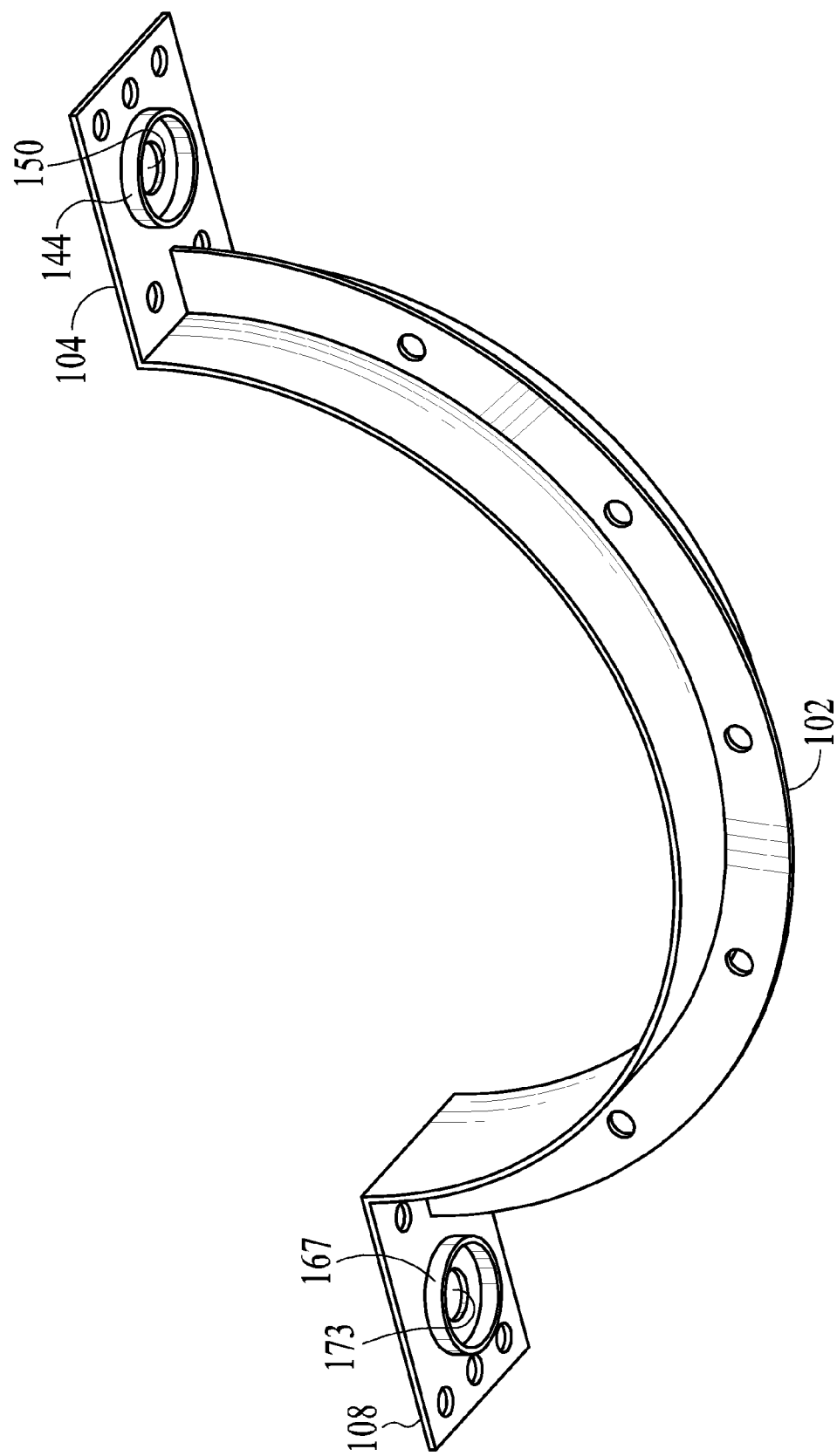
FIG. 6 is a perspective view of an embodiment of a support saddle similar to that shown in FIG. 3 and including a spring retainer.
Figure 7:
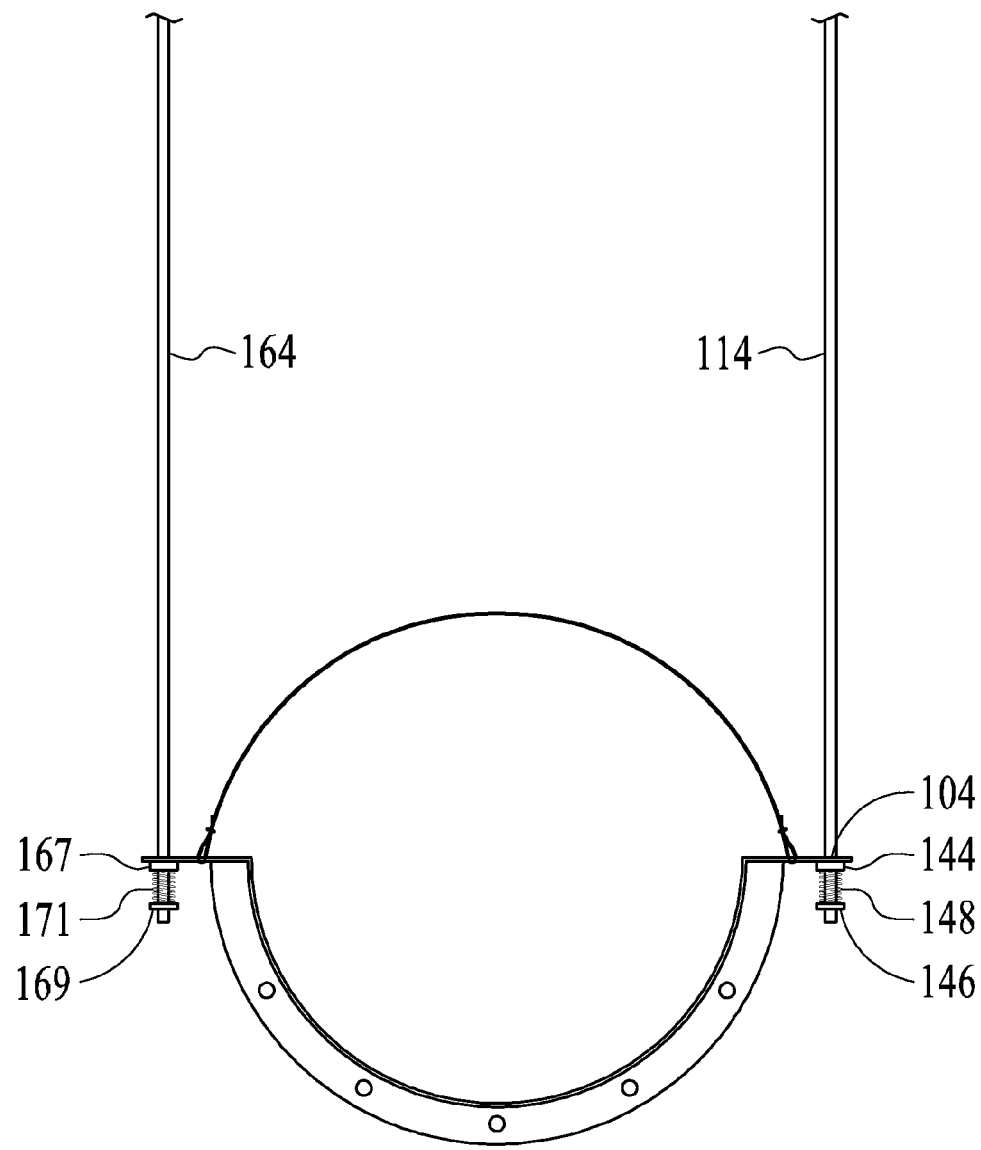
FIG. 7 is a front view of an embodiment of a duct mounting system similar to that shown in FIG. 1 in which the support legs are suspended from overhead and are coupled to the support saddle by saddle connectors that comprise springs.

As shown in FIGS. 6 and 7, in another embodiment a spring receptacle 144 is carried by the first support ear 104 and a spring retainer 146 is carried by the first support leg 114. The first saddle connector comprises a spring 148 disposed between the spring receptacle 144 and the spring retainer 146. In this embodiment the first support leg 114 is shown as being suspended from an overhead structure rather than resting on an underlying structure as in FIGS. 1 and 2, but a similar spring connector may also be used if the support leg rests on an underlying structure simply by arranging the spring 148 and spring retainer 146 in suitable sequence.

The spring retainer 146 may comprise a clip made of elastic material that snaps onto the support leg, in which case the support leg may have a circular groove for receiving the clip. The spring retainer may comprise a nut that screws onto the support leg, in which case a portion of the support leg may be threaded to accommodate such a nut. Or, if the support leg contains mounting holes, the spring retainer may be attached to the support leg by using one or more such holes. The first support ear 104 may have a hole 150, concentric with the spring receptacle 144, large enough to accommodate the first support leg which passes through the first support ear.

Figure 8:
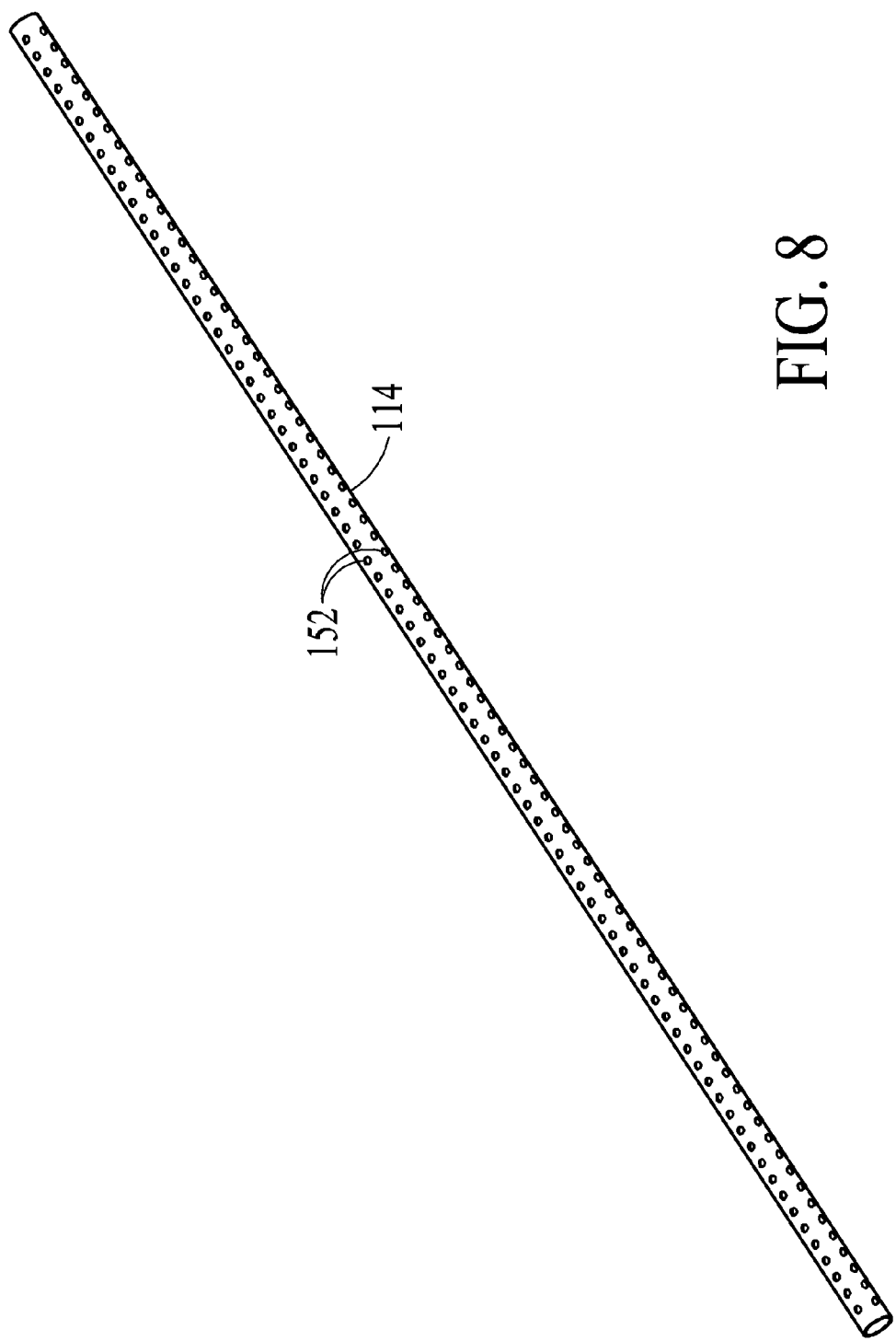
FIG. 8 is a perspective view of an embodiment of a support leg.

As show in FIG. 8, the first support leg 114 may be formed of an elongated hollow tube. In other embodiments the support leg may comprise a rod. A plurality of holes 152 may be formed through the support leg at various points along its length so that the saddle connector may be coupled to the support leg at any of those points as may be convenient.

Figure 9:
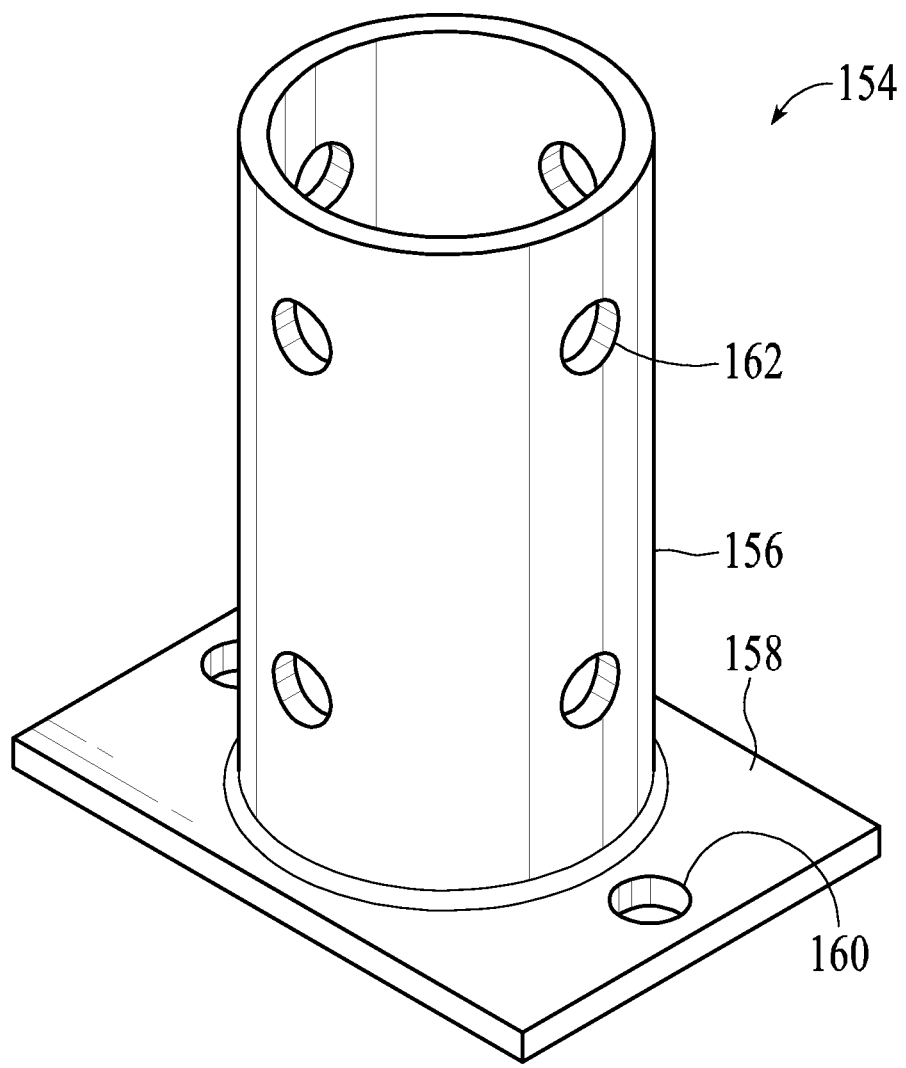
FIG. 9 is a perspective view of an embodiment of a base connector.

FIG. 9 shows a base connector generally 154 that may be used to couple a support leg to an external structure. The base connector includes a tubular portion 156 shaped and sized to receive a support leg, and a planar portion 158 attachable to an external structure by screws, bolts, or other fasteners through one or more holes 160. The tubular portion has one or more holes 162 that may be used to fasten the tubular portion to a support leg, for example by fasteners such as screws or bolts. The base connector 154 may be mounted in any orientation; for example it may be mounted to an overhead structure with the support leg hanging down, or it may be mounted to a wall with the support leg extending horizontally, or it may be mounted on an underlying structure as shown in the embodiment of FIGS. 1 and 2.

In some embodiments a second support leg 164, similar to the first support leg 114, is coupled to the second support ear 108 of the support saddle 102 through a second saddle connector 166 to support the duct on both sides. The second support leg 164 is mounted to an exterior structure through a base connector 168 that may be similar to the base connector 154.

Referring again to FIG. 7, in another embodiment the second support leg 164 may be coupled to the support saddle 102 through a spring mount similar to that already discussed. In this embodiment the ear 108 of the support saddle 102 carries a spring receptacle 167, the support leg 164 carries a spring retainer 169, and a spring 171 is disposed between the spring receptacle 167 and the spring retainer 169. The support leg 164 extends through the ear 108 through a hole 173.

In another embodiment (not shown), a duct may be supported on one side by a support leg mounted to an exterior structure below the duct, in the manner in which both support legs are mounted in the embodiment of FIG. 1, and on the other side by a support leg hanging from an overhead structure, in the manner in which both support legs are suspended in the embodiment of FIG. 7. Either or both support legs may be coupled to the support saddle by means of a saddle connector similar to the saddle connector 118, inasmuch as these components will work equally well in any orientation. Or one or both support legs may be coupled to the support saddle by means of a spring such as the spring 148, inasmuch as the spring also works in any orientation.

Figure 10:
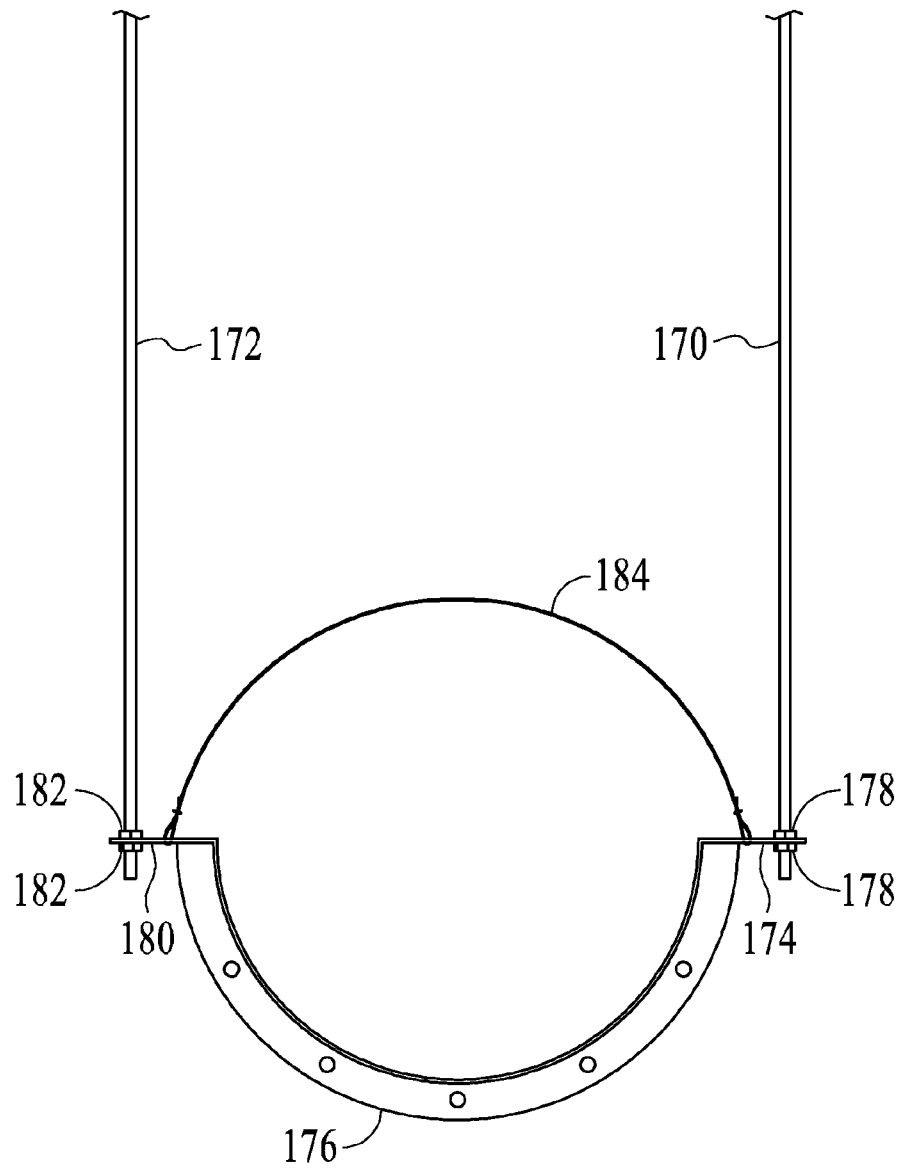
FIG. 10 is a front view of another embodiment of a duct mounting system similar to that shown in FIG. 1 in which the support legs are suspended from overhead and are coupled to the support saddle by saddle connectors that comprise nuts.

FIG. 10 shows an embodiment in which first and second support legs 170 and 172 are suspended from an overhead structure. The first support leg 170 is coupled to a first support ear 174 of a support saddle 176, similar to the first support ear 104 of the support saddle 102, by means of nuts 178 that are screwed onto threads (not shown) in the support leg 170 on either side of the support ear 174. Similarly, the second support leg 172 is coupled to a second support ear 180 of the support saddle 174 by means of nuts 182 that are screwed onto threads (not shown) in the support leg 172. As with the other couplings between support legs and support saddle, this configuration can be used in any orientation as desired. A strap 184 clamps a duct (not shown) onto the support saddle 176.

Figure 11:
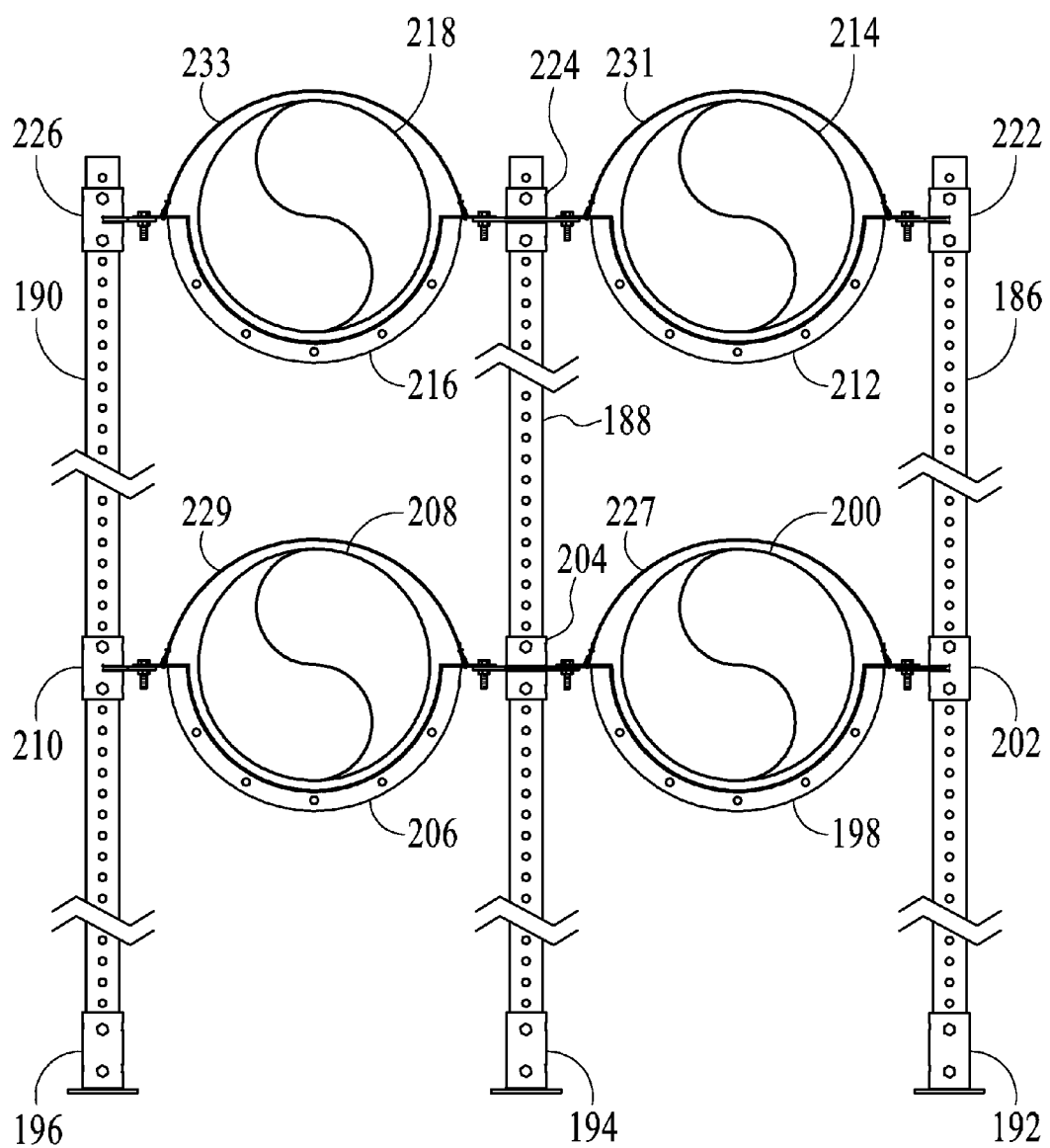
FIG. 11 is a front view of another embodiment of a duct mounting system similar to that shown in FIG. 1 in which more than one duct is supported by each support leg.

More than one duct may be supported by a single support leg, as shown in FIG. 11. First, second, and third support legs 186, 188 and 190 are mounted on an underlying structure through first, second, and third base connectors 192, 194, and 196, respectively. A first saddle support 198 supports a duct 200. The first saddle support 198 is coupled to the first and second support legs by first and second saddle connectors 202 and 204, respectively. The first saddle connector 202 is similar to the saddle connector 118 and the second saddle connector 204 is similar to the saddle connector illustrated in FIG. 5, with planar portions extending in opposite directions from the tubular portion. A second saddle support 206 supports a duct 208 in side-by-side orientation with respect to the duct 200. The second saddle support is coupled to the second and third support legs 188 and 190 by the second saddle connector 204 and a third saddle connector 210, respectively. The third saddle connector 210 is similar to the saddle connector 118. In this configuration the first leg 186 provides half the support of the duct 200, the third leg 190 provides half the support of the duct 208, and the second leg 188 provides the other half of the support of both ducts.

The support legs can also extend vertically to support more ducts. For example, in this embodiment a saddle support 212 supports a duct 214 above the duct 200, and a saddle support 216 supports a duct 218 above the duct 208. The saddle support 212 is coupled to the first and second support legs by saddle connectors 222 and 224, respectively, similar to the saddle connectors 202 and 204, respectively. The saddle support 216 is coupled to the second and third support legs 188 and 190 by the saddle connector 224 and a saddle connector 226, respectively. Thus the first leg 186 provides half the support of the duct 214, the third leg 190 provides half the support of the duct 218, and the second leg 188 provides the other half support of both ducts. In total, the three legs 186, 188, and 190 support the four ducts 200, 208, 214 and 218. More ducts may be disposed adjacent these ducts either vertically or horizontally and supported in a similar manner.

Retaining straps 227, 229, 231, and 233 secure the ducts to their respective saddle supports.

Referring again to FIG. 1, two support saddles 226 and 228 may be used to completely encircle the duct 122 as an alternative to using one support saddle and one retaining strap. In this case, support ears of the support saddles 226 and 228 are attached to each other, for example by bolts 230.

Figure 12:
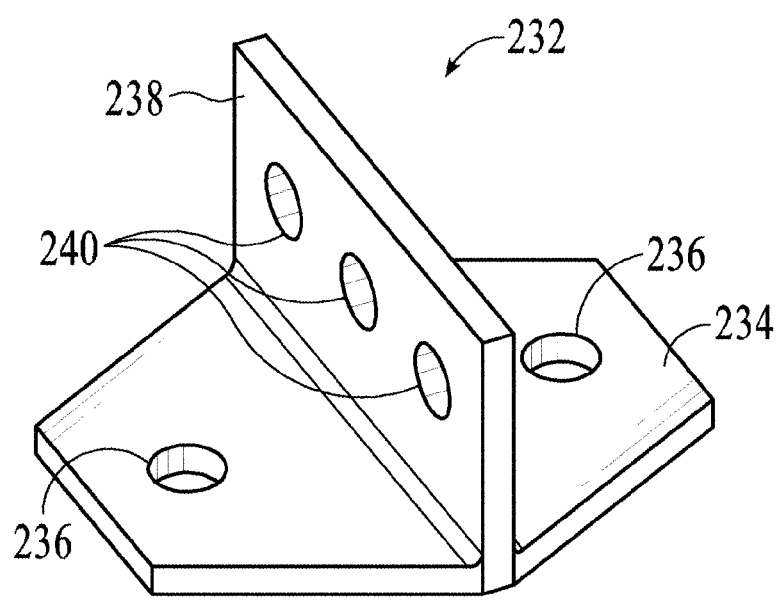
FIG. 12 is a perspective view of an embodiment of a T-bracket as shown in FIG. 1.

The support saddles 226 and 228 may be mounted to an external structure by means of a T-bracket 232 as illustrated in FIG. 12. The T-bracket 232 has a planar member 234 that may be attached to the external structure, for example by fasteners (not shown) through holes 236, and a rib member 238 perpendicular to the planar member. The rib member 238 may be connected to the support ears of one or both of the support saddles 226 and 228, for example by fasteners 241 through holes 240.

Figure 13:
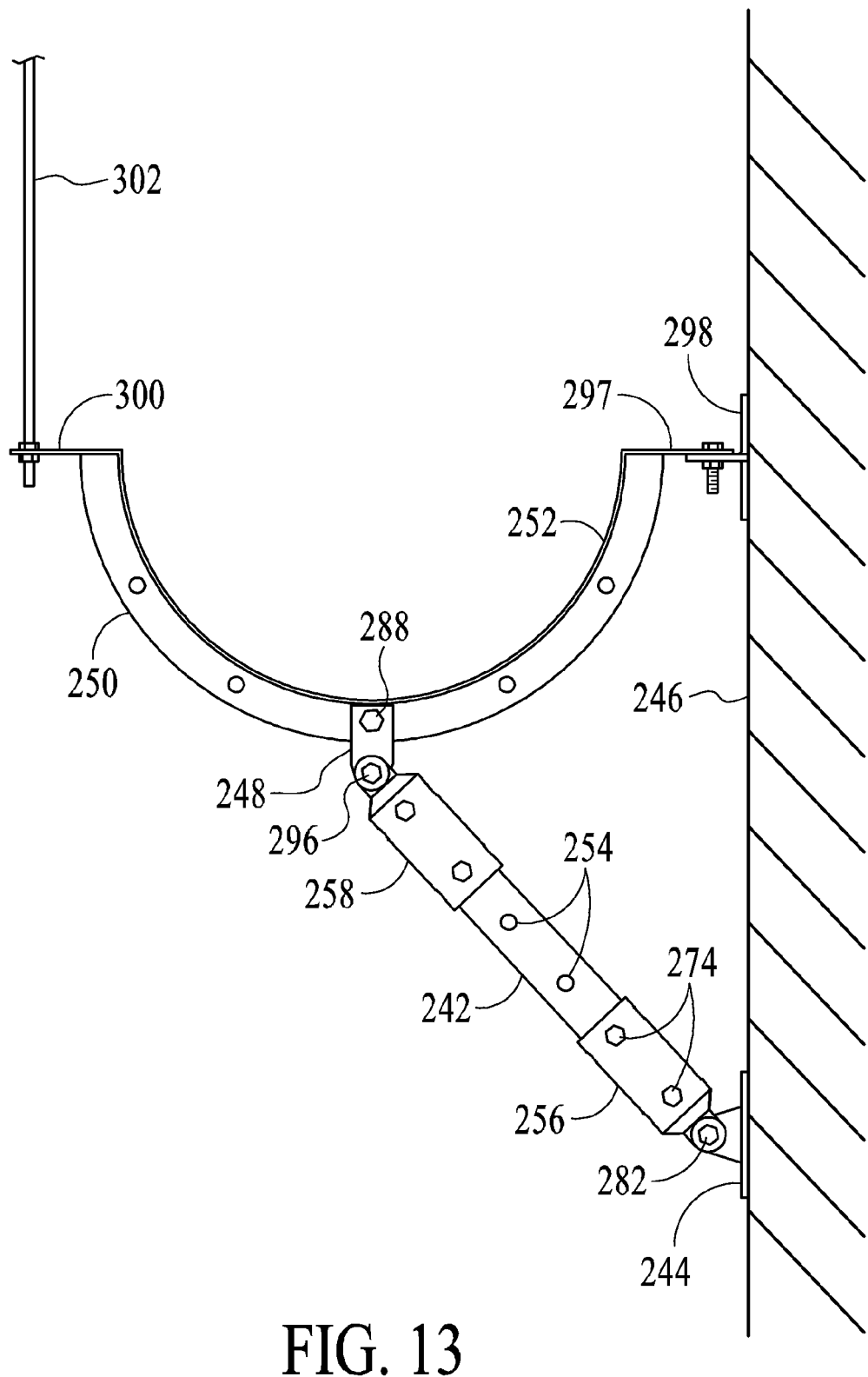
FIG. 13 is a front view of an embodiment of a duct mounting system similar to the embodiment shown in FIG. 1 and also having a stabilizer leg.

FIG. 13 illustrates an embodiment of a duct mounting system generally similar to that shown in FIGS. 1 and 2 and also having a stabilizer leg 242. This embodiment includes a stabilizer base plate 244 connectable to an external structure 246 and a saddle connector 248 connected to the stiffening stem 250 of a saddle support 252. The stabilizer leg 242 is mounted to the stabilizer base plate 244 at an oblique angle and to the saddle connector 248 at an oblique angle and provides stability to the duct mounting system.

The stabilizer leg 242 may be formed as a tube, a rod, or some other suitable shape. The stabilizer leg may include one or more mounting holes 254. The stabilizer leg is connected to the stabilizer base plate 244 through a coupler 256 and to the saddle connector 248 through a coupler 258.

Figure 14:
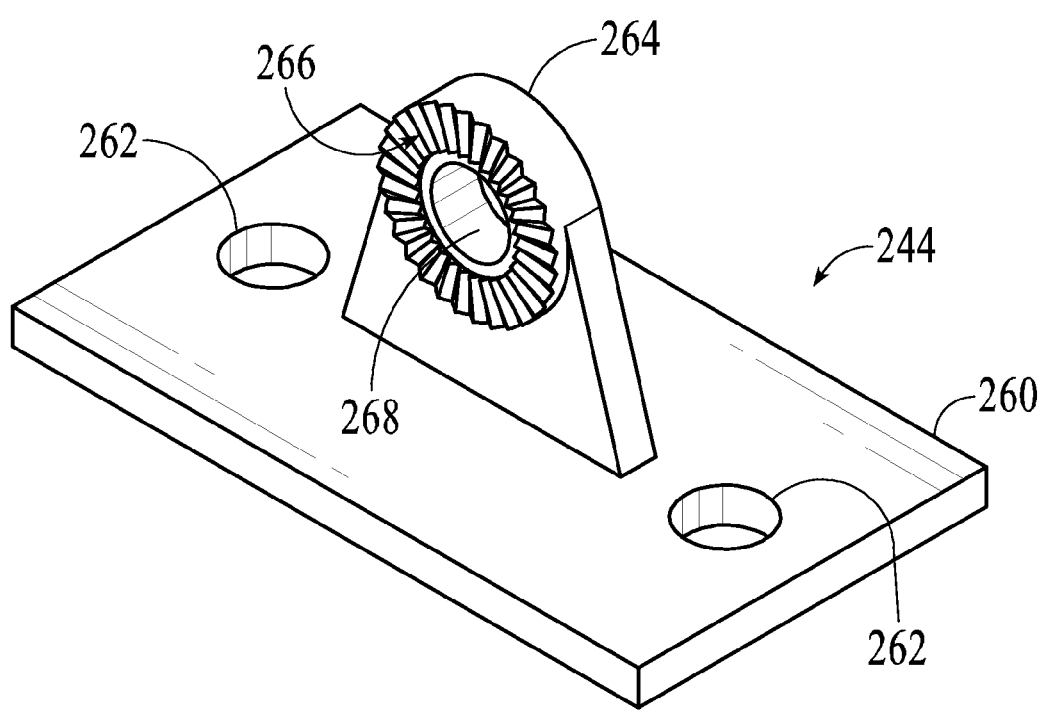
FIG. 14 is a perspective view of a stabilizer base plate as in the embodiment of FIG. 13.

As shown in FIG. 14, the base plate 244 has a planar portion 260 with one or more mounting holes 262 for mounting to the external structure 246. The base plate 244 also has a mounting member 264 with a serrated surface 266 surrounding a mounting hole 268.

Figure 15:
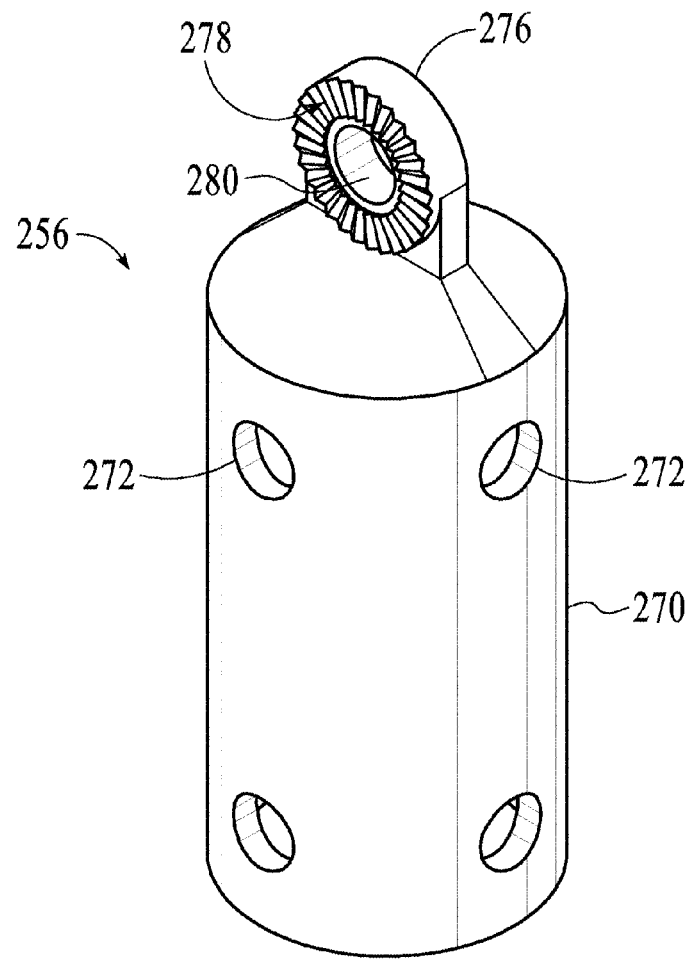
FIG. 15 is a perspective view of a coupler as in the embodiment of FIG. 13.

Referring to FIG. 15, the coupler 256 has a tubular portion 270 for receiving the stabilizer leg 242. The tubular portion 270 has one or more mounting holes 272 for connecting to the stabilizer leg, for example by means of connectors such as bolts 274. The coupler 256 also has a mounting member 276 with a serrated surface 278 surrounding a mounting hole 280.

The serrated surface 266 of the stabilizer base plate 244 complements the serrated surface 278 of the coupler 256. By means of a fastener such as a bolt 282 extending through the holes 268 and 280, the coupler 256 can be locked to the base plate 244 at any desired oblique angle.

In a similar manner, the stabilizer leg 254 is connected to the saddle connector 248 through the coupler 258 which is similar to the coupler 256.

Figure 16:
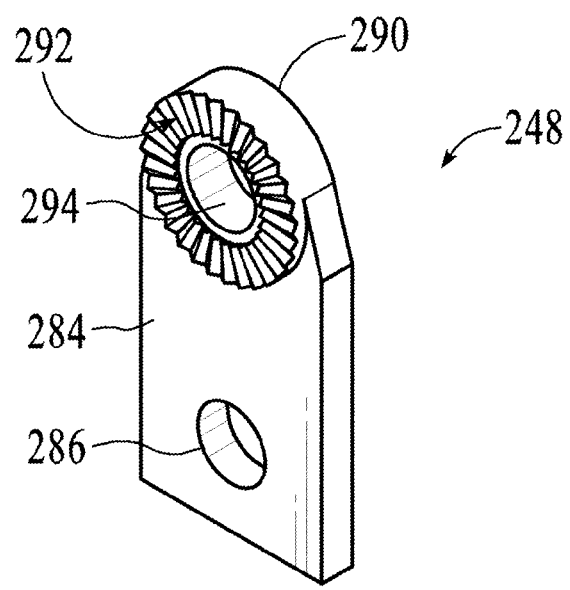
FIG. 16 is a perspective view of a saddle connector as in the embodiment of FIG. 13.

As shown in FIG. 16, the saddle connector 248 has a planar portion 284 with a mounting hole 286 for mounting to the stiffening stem 250, for example by a fastener such as a bolt 288. The base plate 244 also has a mounting portion 290 with a serrated surface 292 surrounding a mounting hole 294.

The serrated surface 292 of the saddle connector 248 complements the serrated surface (not shown) of the coupler 258. By means of a fastener such as a bolt 296 extending through the hole 294 and a corresponding hole (not shown) in the coupler 258, the coupler 258 can be locked to the saddle connector 248 at any desired oblique angle.

A support ear 297 of the saddle support 252 is connected to the external structure 246 through a T-bracket 298 similar to the T-bracket 232 depicted in FIG. 12. Another support ear 300 is supported from above by a support leg 302.

Figure 17:
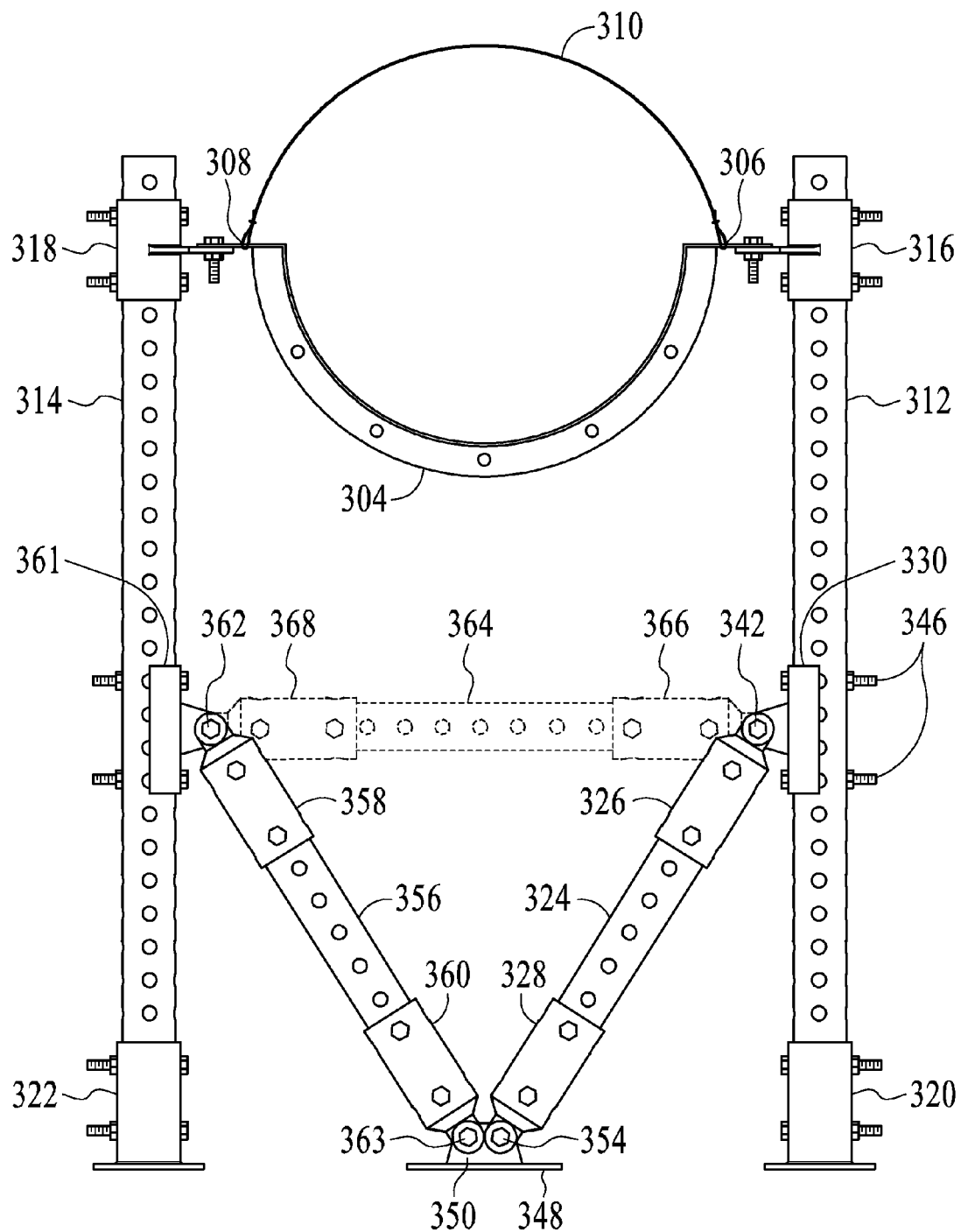
FIG. 17 is a front view of an embodiment of a duct mounting system similar to the embodiment shown in FIG. 1 but having one or more stabilizer legs connected between the support legs and an external structure.

FIG. 17 shows an embodiment of a duct mounting system similar to the one shown in FIGS. 1 through 3 as described above, except that this embodiment includes one or more stabilizer legs connected between a support leg and an external structure or between two support legs. The system includes a support saddle 304, first and second support ears 306 and 308 defined in extremities of the support saddle, a retaining strap 310 connected between the first and second support ears, and first and second support legs 312 and 314. The support legs are connected to the support saddle through saddle connectors 316 and 318, respectively, and to the external structure through base connectors 320 and 322.

A stabilizer leg 324 is connected between the first support leg 312 and the external structure through couplers 326 and 328, respectively, each of which is similar to the coupler 256.

Figure 18:
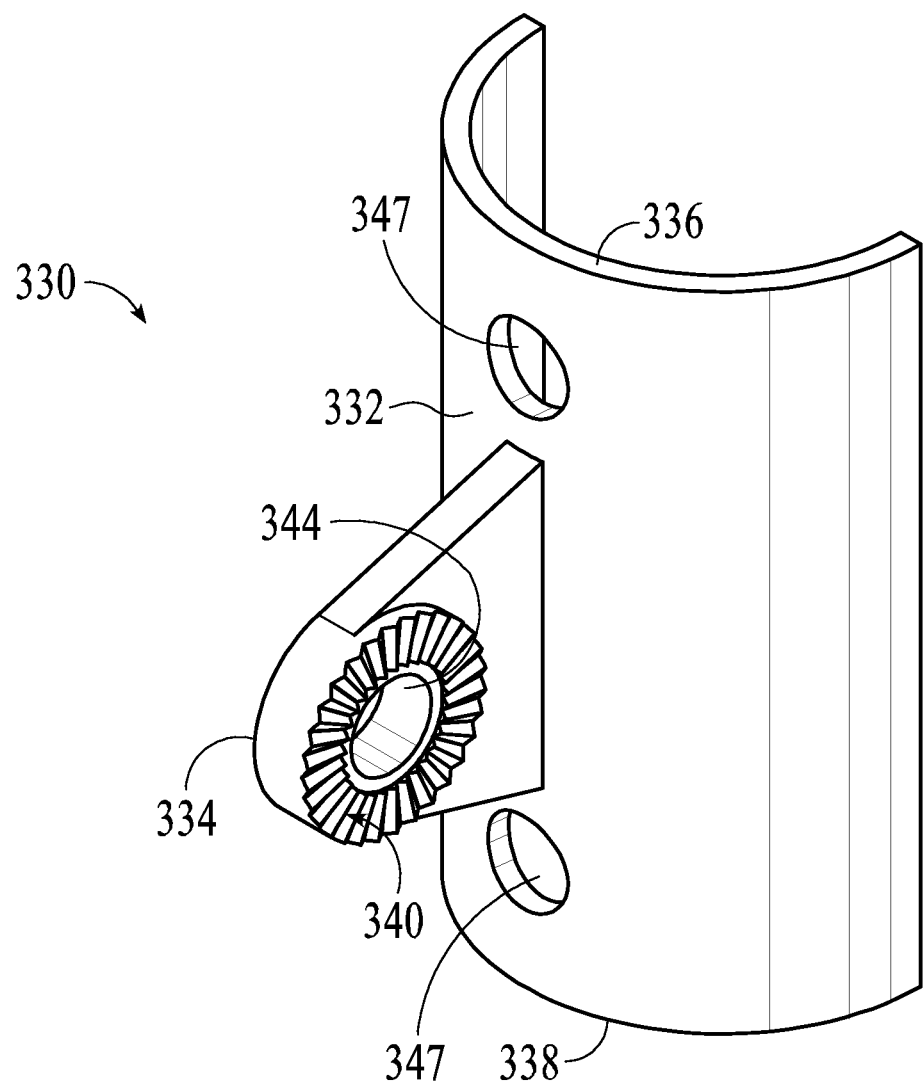
FIG. 18 is a perspective view of a saddle connector as in the embodiment of FIG. 17.

The coupler 326 is mounted to the support leg 312 by means of a semicircular coupler 330. As shown in FIG. 18, the semicircular coupler 330 is somewhat similar to the coupler 256 except that it has an open curved body 332 rather than the tubular portion 270 of the coupler 256, and it has a planar portion 334 generally centered between extremities 336 and 338 of the open curved body. A serrated surface (not shown) of the coupler 326 is locked to a serrated surface 340 of the planar portion 334 of the semicircular coupler 330, for example by a bolt 342 that extends through a hole (not shown) in the serrated surface of the coupler 326 and through a hole 344 in the center of the serrated surface 340. The open curved body has a radius that matches that of the first support leg 312 and is attached to the first support leg 312 by fasteners such as bolts 346 through mounting holes 347.

The coupler 328 is mounted to the external surface through a base plate 348. The base plate 348 is similar to the base plate 244 except that the base plate 348 has two serrated surfaces (not shown) rather than the single serrated surface of the base plate 248. One serrated surface of the base plate 348 is locked to a serrated surface of the coupler 328 by a fastener such as a bolt 354.

In one embodiment two stabilizer legs are used, one of which is the stabilizer leg 324 as described and the other of which is a second stabilizer leg 356. The second stabilizer leg 356 is connected between the second support leg 314 and the external surface, in a manner similar to the connections of the stabilizer leg 324, through couplers 358 and 360.

The coupler 358 couples the stabilizer leg 356 to the second support leg 314 through a semicircular coupler 361. The semicircular coupler 361 is similar to the semicircular coupler 330. The coupler 358 is connected to the coupler 361 by a fastener 362. The coupler 360 is connected to the base plate 348 by a fastener 363 in a manner similar to that already described respecting the coupler 328.

In lieu of, or in addition to, the stabilizer legs 324 and 356, a cross stabilizer leg 364 may be connected directly between the two support legs 312 and 314 using couplers 366 and 368 each of which is similar to the coupler 326.

Figure 19:
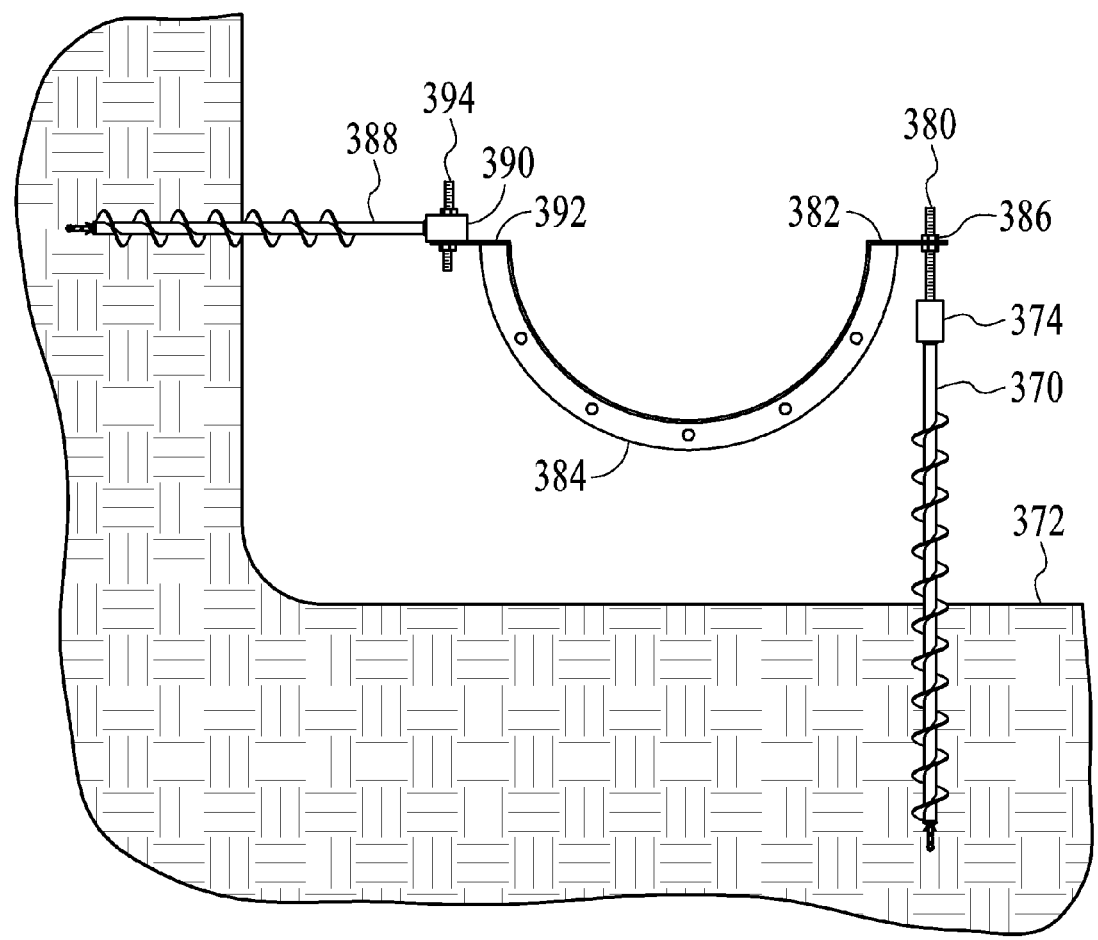
FIG. 19 is a front view of an embodiment of a duct mounting system similar to the embodiment shown in FIG. 1 but using augurs for both support legs.
Figure 20:
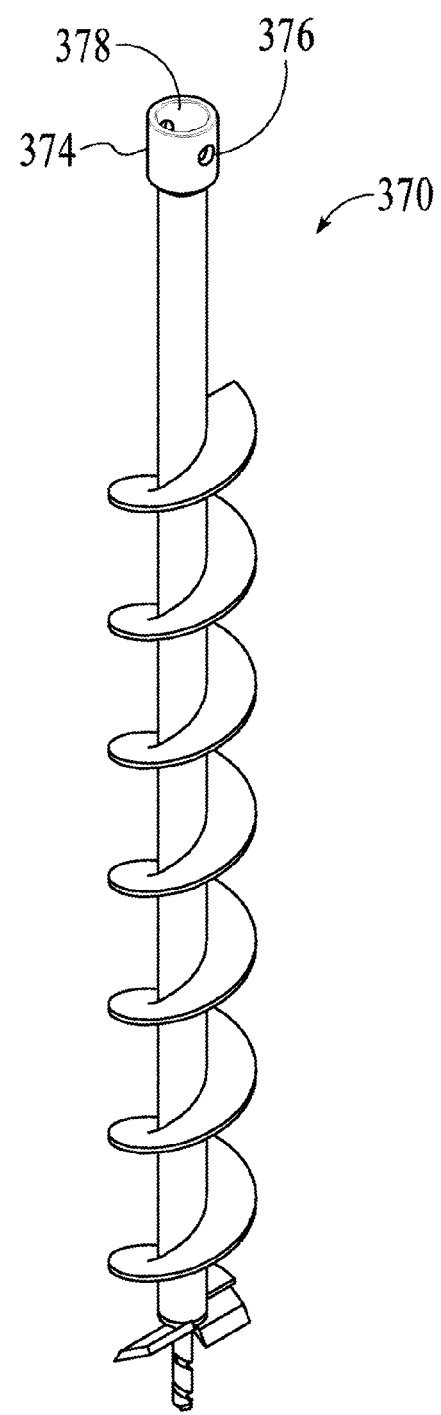
FIG. 20 is a perspective view of an augur as in the embodiment of FIG. 19.

FIG. 19 illustrates an embodiment of a duct mounting system similar to those already described except that the support legs are formed as augurs. A first support leg 370 has been driven into a structural element 372 in a vertical orientation. The structural element 372 may for example comprise concrete. The support leg 370 carries a collar 374 as best shown in FIG. 20. The collar 374 has a mounting hole 376 and an open extremity 378. A threaded shaft 380 has been installed in the collar 374 either by threads cut in the open extremity 378 or by a fastener such as a bolt (not shown) in the mounting hole 376. The threaded shaft 380 is connected to a support ear 382 of a saddle support 384 by nuts 386 or some other connector as desired.

In similar manner a second support leg 388 has been driven into the structural element 372, but in a horizontal orientation rather than the vertical orientation of the first support leg 370. The second support leg 388 carries a collar 390 that is attached to a support ear 392 of the saddle support 384, for example by a bolt 394.

In other embodiments one of the support legs is formed as an auger and the other support leg is similar to the support legs already described in connection with other embodiments.

Figure 21:
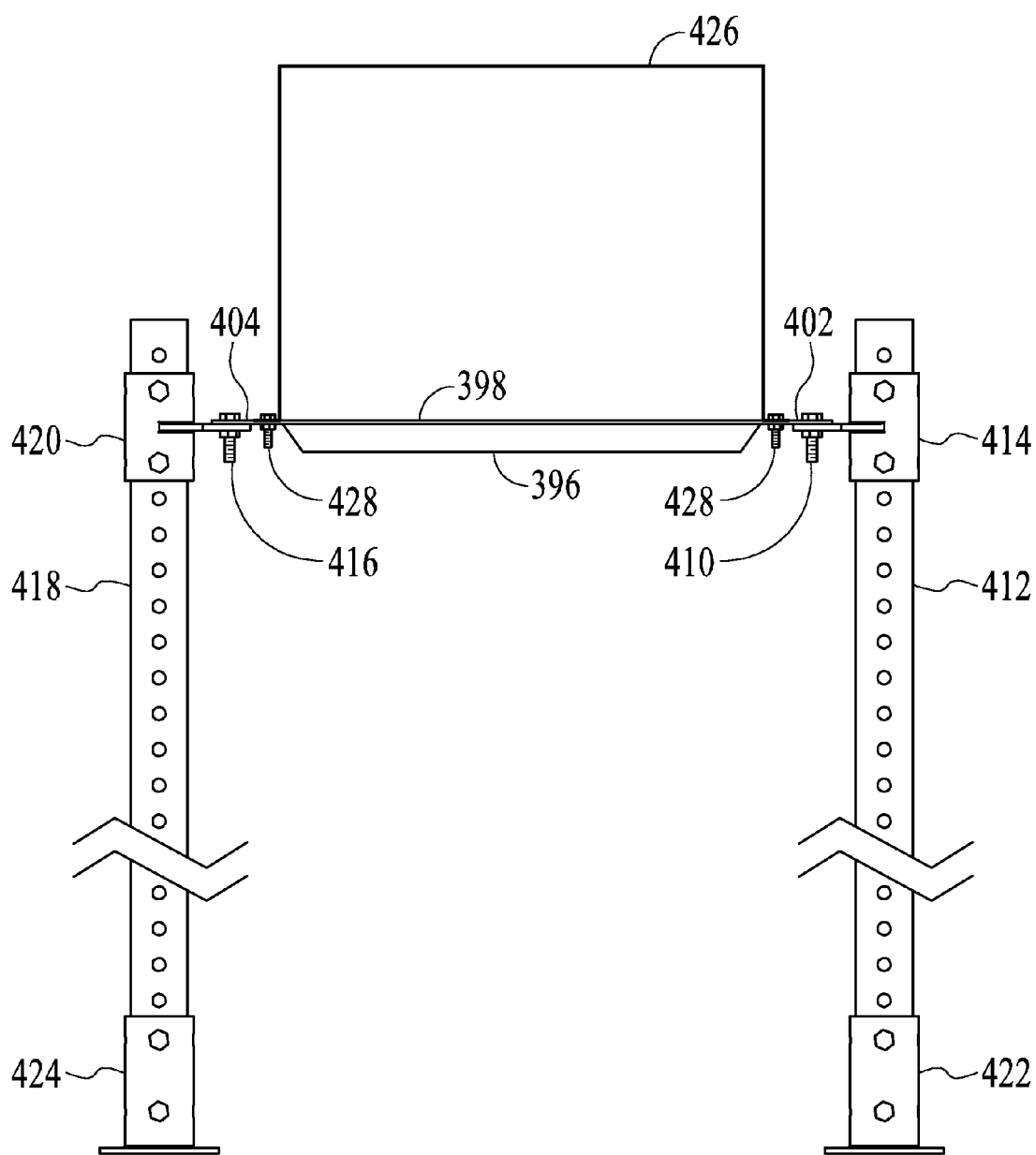
FIG. 21 is a front view of another embodiment of a duct mounting system in which a saddle support and a retaining strap are shaped to accommodate a duct having a rectangular cross section.
Figure 22:
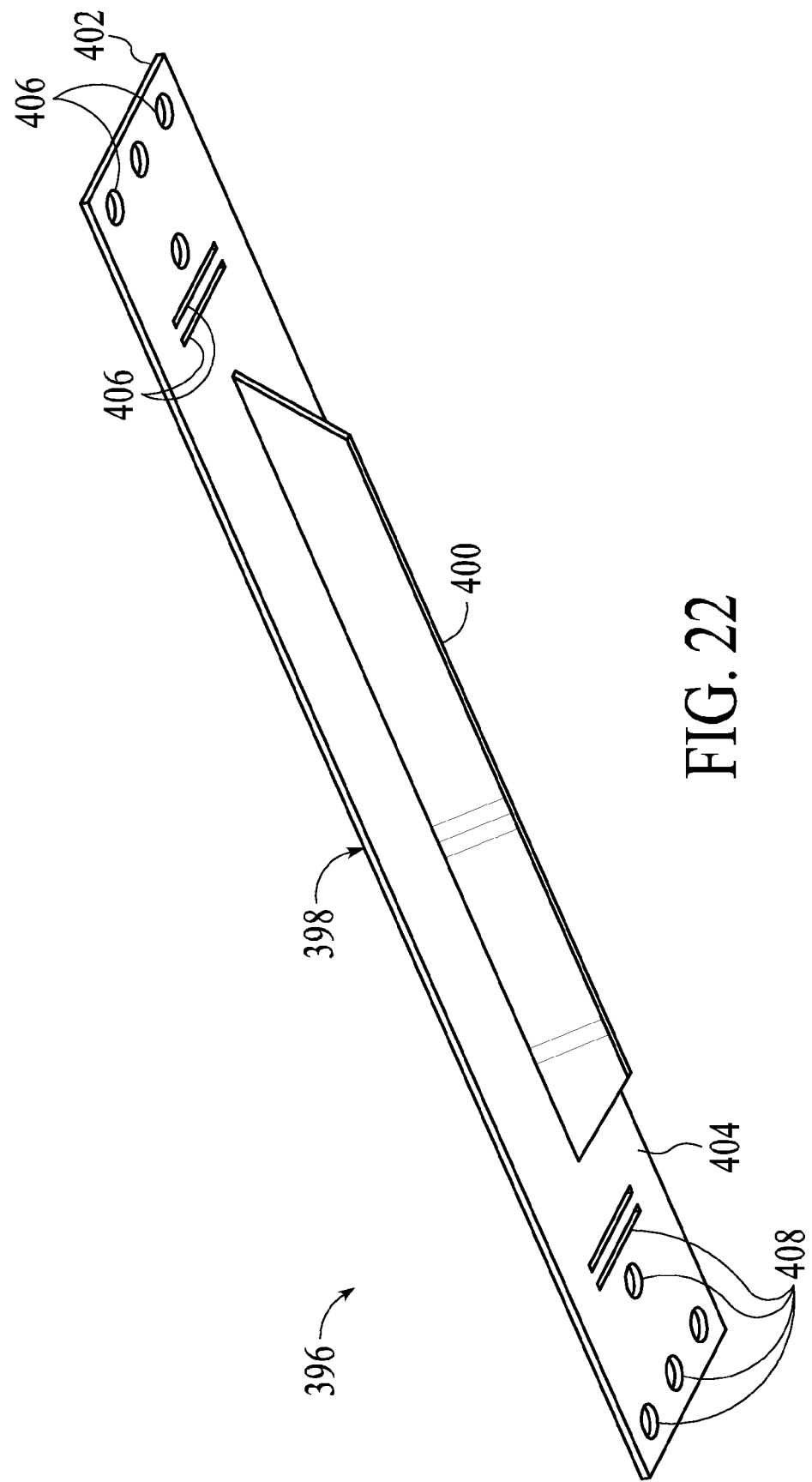
FIG. 22 is a perspective view of a saddle support as in the embodiment of FIG. 21.

FIG. 21 illustrates another embodiment in which a saddle support 396 has a duct surface 398 shaped to accommodate a duct (not shown) with a rectangular cross-section. As shown in FIG. 22, the saddle support 396 has a stiffening stem 400 on a side opposite the duct surface 398. First and second support ears 402 and 404 are formed in opposing extremities of the saddle support. Each support ear has a plurality of mounting holes 406 and 408, respectively.

The support ear 402 is connected by a fastener such as a bolt 410 to a first support leg 412 through a saddle connector 414 similar to the saddle connectors already discussed. Similarly the support ear 404 is connected by a fastener such as a bolt 416 to a second support leg 418 through a saddle connector 420. The legs are connected to an external structure (not shown) through base connectors 422 and 424 respectively. A retaining strap 426, having a rectangular U shape to clamp a duct of rectangular cross-section onto the duct surface 398, is connected between the support ears 402 and 404, for example by fasteners such as bolts 428. In some embodiments the retaining strap 426 is made of flexible material and accommodates to the shape of the duct while being installed.

In some embodiments various ones of the components as described may be fabricated of sheet steel, extruded aluminum, composites, or other materials suitable for the weight of the duct to be mounted and the environment. Corrosion-resistant materials may be used if corrosive substances are likely to be present, for example if corrosive gases are to be carried in the duct or if the installation may be exposed to salty air or other adverse environmental conditions.

A duct mounting kit including a selection of parts of the kind described above is designed to be carried in the field and used to install ductwork in any commonly-encountered construction project. Such a kit obviates any need to select and procure special hardware for each job or to fabricate custom mounting parts. One embodiment of such a duct mounting kit includes a plurality of support saddles each having a duct surface shaped to accommodate and support a duct, a plurality of retaining straps, a plurality of support legs, and a plurality of saddle connectors.

At least two of the support saddles in the kit have a semicircular shape that accommodates a duct having a circular cross-section of a first radius. At least two of the support saddles have a semicircular shape that accommodates a duct having a circular cross-section of a second radius. Each support saddle includes a stiffening stem and has support ears defined in opposite extremities.

Each retaining strap is connectable between the support ears of one of the support saddles and is shaped to clamp a duct onto one of the support saddles. Each strap may be sized for only one size duct, or one strap may be usable on ducts of several different sizes by adjusting its fastener.

At least two of the support legs have a first length and at least two others of the support legs have a second length. Each support leg has an extremity connectable to an external structure.

Each saddle connector is connectable between one of the support legs and one of the support ears. Some of the saddle connectors may include a tubular portion shaped to receive one of the support legs and a planar portion connectable to one of the support ears.

Some of the support legs may include spring retainers and some of the saddle connectors may be springs disposable between one of the spring retainers and one of the support ears. Spring receptacles may be provided on, or for attachment to, some of the support saddles.

In some embodiments the kit may include a plurality of stabilizer legs, a plurality of stabilizer base plates each connectable to an external structure, and a plurality of saddle connectors connectable to the stabilizer legs and to the stiffening stems or the support legs at oblique angles.

Some of the support legs may be formed as augurs.

The kit may include a plurality of support saddles shaped to accommodate a duct having a rectangular cross-section, at least two of them sized to support a duct of a first width and at least two of them sized to support a duct of a second width. Each such support saddle includes a stiffening stem and support ears.

The kit may have many more of these components than the quantities listed above, and it may have components that fit more than two duct sizes.

A duct mounting system as described above provides solid structural support for ductwork in any of numerous different configurations and environments. Ducts mounted with such a system are protected from deformation or constriction of the flow of air or other gases through the duct. Spring couplings as described above protect a duct in an installation where seismic events or other mechanical impacts may occur. A duct mounting kit that includes components of the system can readily be transported to construction sites to mount ductwork at the jobsite without any need for special selection and procurement of individual hardware items or for the custom design and fabrication of parts.

We claim:

1. A duct mounting system comprising:
 a support saddle having a duct surface shaped to accommodate and support a duct, the support saddle including a stiffening stem;
 a first support ear defined in a first extremity of the support saddle and a second support ear defined in a second extremity of the support saddle;
 a flexible retaining strap connectable between the first and second support ears, the retaining strap shapeable to clamp ducts of various shapes onto the duct surface;
 a first support leg having an extremity connectable to an external structure, and
 a first saddle connector that couples the first support leg to the first support ear, the first saddle connector comprising:
 a tubular portion shaped to receive the first support leg, the tubular portion having a plurality of connector openings extending therethrough;
 a plurality of connectors extending through the openings and the first support leg;
 a planar portion complementary in shape to the first support ear; and
 one or more connectors securing the planar portion to the first support ear.

2. The system of claim 1 wherein the planar portion of the first saddle connector extends laterally away from the tubular portion in more than one direction, the planar portion having one or more connector openings in a first extremity that extends in one direction and one or more connector opening in a second extremity that extends in a second direction whereby the saddle connector is connectable to two support saddles.

3. The system of claim 1 and further comprising:
 a second support leg having an extremity connectable to an external structure, and
 a second saddle connector connecting the second support leg and the second support ear, the second saddle connector comprising a tubular portion shaped to receive the second support leg, the tubular portion having a plurality of connector openings extending therethrough, a plurality of connectors extending through the openings and the second support leg; and a planar portion complementary in shape to the second support ear and secured to the second support ear by one or more connectors.

4. A duct mounting kit comprising:
 a first plurality of support saddles each having a duct surface shaped to accommodate and support a duct, at least two of the support saddles having a semicircular shape that accommodates a duct having a circular cross-section of a first radius and at least two of the support saddles having a semicircular shape that accommodates a duct having a circular cross-section of a second radius, each support saddle including a stiffening stem, each support saddle including support ears defined in opposite extremities of the support saddle;
 a plurality of flexible retaining straps each connectable between the support ears of one of the support saddles, each strap shapeable to clamp ducts of various shapes onto one of the support saddles;
 a plurality of support legs, at least two of the legs having a first length and at least two of the legs having a second length, each support leg having an extremity connectable to an external structure; and
 a plurality of saddle connectors each connectable between one of the support legs and one of the support ears, each of a first plurality of the saddle connectors comprising:
 a tubular portion shaped to receive one of the support legs, each tubular portion having a plurality of connector openings extending therethrough;
 a plurality of connectors adapted to extend through the openings and a support leg;
 a planar portion connectable to one of the support ears; and
 a plurality of connectors adapted to secure the planar portion to one of the support ears.

* * * * *